United States Patent [19]

Hart

[11] Patent Number: 4,498,712
[45] Date of Patent: Feb. 12, 1985

[54] EMPTY/LOAD BRAKE CONTROL ARRANGEMENT
[75] Inventor: James E. Hart, Trafford, Pa.
[73] Assignee: American Standard Inc., Wilmerding, Pa.
[21] Appl. No.: 505,138
[22] Filed: Jun. 16, 1983
[51] Int. Cl.³ .................................................. B60T 8/18
[52] U.S. Cl. .................................. 303/23 R; 303/22 R
[58] Field of Search ................ 303/22 A, 23 R, 23 A, 303/73, 79

[56] References Cited
U.S. PATENT DOCUMENTS
2,830,849  4/1958  Erson et al. .......................... 303/22
3,671,086  6/1972  Scott .................................. 303/23 R Primary Examiner—Bruce H. Stoner, Jr.
Assistant Examiner—Alvin Oberley
Attorney, Agent, or Firm—G. J. Falce

[57] ABSTRACT

Brake apparatus for a railway vehicle including a brake cylinder device of the type having a pair of interconnected pistons of unequal size to which the vehicle brake rigging is connected. The larger power piston forms an application chamber and a release chamber on its opposite sides in which air is stored for use in controlling the vehicle brakes. The release chamber air is vented to atmosphere during a brake application by way of an empty/load brake control valve device including a changeover valve and a pressure sensitive check valve. When the vehicle is empty, the release chamber air is vented by way of the check valve, which limits the maximum reduction of release chamber pressure and accordingly establishes the maximum empty vehicle brake force obtained. A load piston biases the check valve with application chamber air, which is charged from the brake pipe so that the check valve bias and consequently the maximum reduction of release chamber pressure reflects the train charge. The empty/load control is protected against false transitions of the change-over valve due to car jounce and rock by a delay choke and an exhaust shut-off valve in parallel with the foregoing check valve and changeover valve.

11 Claims, 1 Drawing Figure

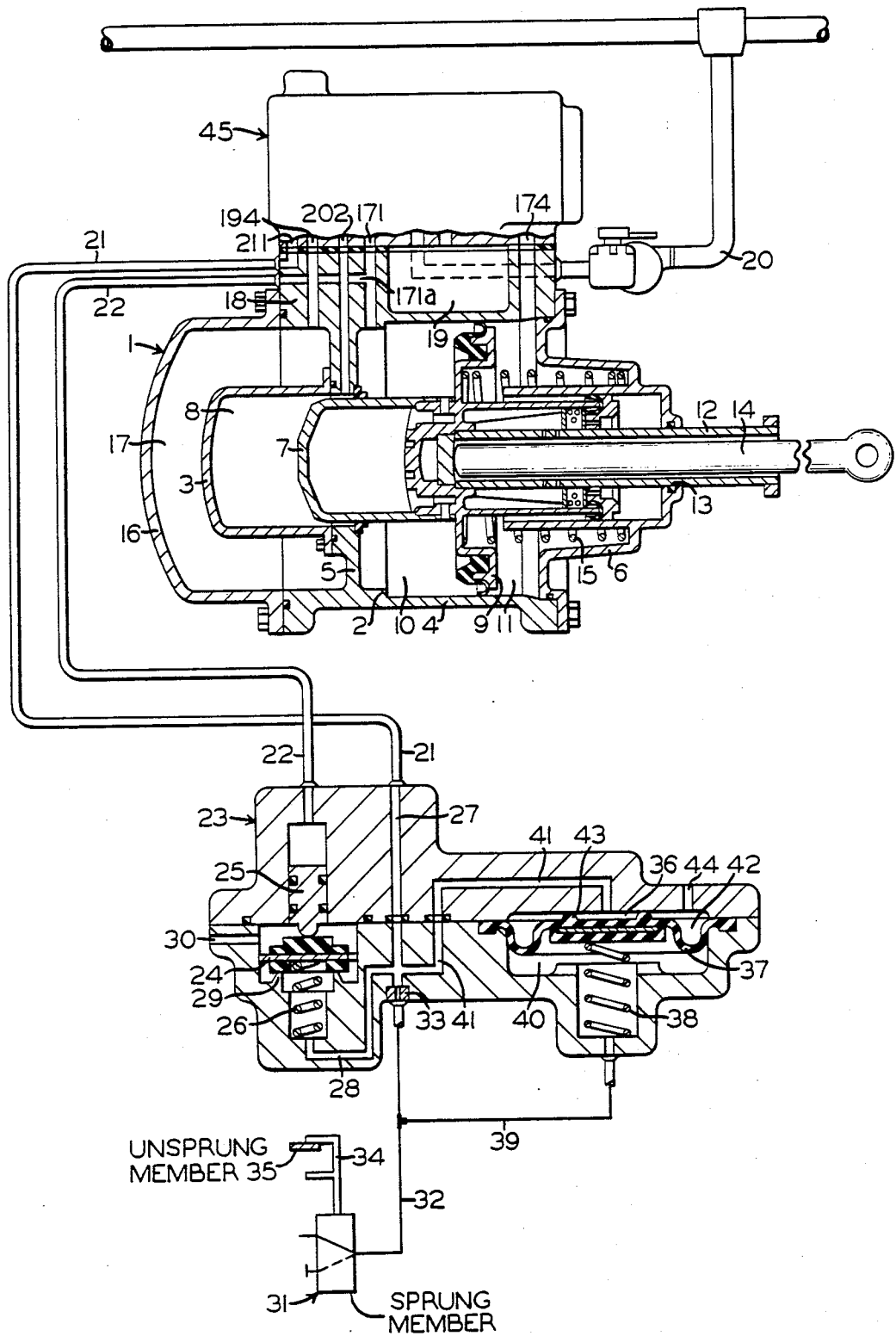

EMPTY/LOAD BRAKE CONTROL ARRANGEMENT

Material essential to the understanding of the present invention is incorporated herein by reference to allowed U.S. application, Ser. No. 300,705, now U.S. Pat. No. 4,405,182 which is assigned to the assignee of the present invention.

BACKGROUND OF THE INVENTION

The present invention relates to railway brake apparatus of the type employing a brake actuator in which dual pistons are tandem-connected, one being larger than the other and cooperating with the cylinder thereof to form an application chamber and a release chamber on the opposite sides in which compressed air is stored to develop the desired brake forces, without the need for separate, conventional storage reservoirs.

During brake release, compressed air is supplied to these storage chambers by a control valve device that is operative in response to variations in the train brake pipe pressure. When a brake application is initiated, the control valve device connects air from the release chamber of the larger power piston to the opposite side of the smaller positioning piston. A one-way check valve device is provided to effect pressure equalization between the opposite application and release chambers of the power piston to permit movement of the dual pistons in a brake application direction under the influence of the pressure acting on the positioning piston.

In application position of the tandem-connected dual pistons, the control valve device associated with the brake actuator exhausts the release chamber air on one side of the power piston to atmosphere to establish a pressure differential across the power piston and to accordingly produce the desired braking force.

Empty/load brake equipment is normally provided on railway trains to prevent sliding wheels and to more equally distribute car retardation forces throughout the train during braking, with respect to different car load conditions.

In the aforementioned referencing application, there is disclosed an empty/load arrangement, as shown in FIGS. 1 and 6 thereof, in which a two-position changeover valve is provided to sense the vehicle load condition according to the degree of deflection of the vehicle. In the "load" condition the release chamber air on the one side of the power piston is connected directly to atmosphere, while in the "empty" condition, this air is connected to atmosphere via a one-way check valve device. The value of a spring that normally biases the check valve closed determines the air pressure that is retained on the one side of the power piston to limit the pressure differential thereacross and accordingly establish the "empty" vehicle brake force. Since the spring characteristics are constant, the "empty" brake force reduction remains the same for any given reduction of brake pipe pressure, even though higher brake pipe charges may be carried where higher braking pressures are desired.

SUMMARY OF THE INVENTION

It is therefore an object of the present invention to provide an empty/load type brake apparatus for a railway train that is pressure-sensitive to provide trains carrying relatively high levels of brake pipe charge with the capability of producing higher levels of load-adjusted brake pressure.

Another object of the invention is to provide an empty/load brake apparatus that is desensitized to rocking and jouncing of the railway cars during train movement.

In accomplishing these objectives, a one-way pressure retaining check valve of the empty/load brake apparatus is acted upon in an opening direction by air exhausted from the release chamber of a daul piston-type brake actuator during a brake application, in order to exhaust this air when an empty/load changeover valve is closed in the "empty" condition of a railway car. A load piston subject to air in the application chamber of the brake actuator acts on the check valve in the opposite or closing direction. Since the application chamber air is charged from the brake pipe, the pressure acting on the check valve load piston reflects the pressure carried by the train, and effects closure of the check valve at correspondingly different values of the release chamber pressure to limit the maximum release chamber pressure reduction accordingly. By limiting the exhaust of release chamber air pressure, the maximum pressure differential and force output of the power piston is also limited. Thus, the maximum degree of brake pressure modulation under "empty" conditions of vehicle braking increases with higher train pressures, since the purpose of carrying higher train pressures is to obtain a greater brake force.

Arranged in parallel with the empty/load changeover valve is an empty car exhaust shut-off valve via which air from the release chamber of the brake actuator is exhausted when the changeover valve is set for "load" braking. In "empty" setting of the changeover valve, the shut-off valve closes to interrupt the exhaust of air from the release chamber. The purpose of this shut-off valve in parallel with the changeover valve is to isolate car oscillations between the "empty" and "load" settings of the changeover valve from the actual exhaust control of the release chamber air. This is accomplished by placing a delay choke in the control line leading to one side of the exhaust valve diaphragm to delay movement of the diaphragm valve between an exhaust-open and exhaust-closed position. The delay on actuation of this shut-off valve, for a period of time sufficient to isolate false settings of the changeover valve due to car rock and jounce, prevents an improper transition of the shut-off valve from occurring.

BRIEF DESCRIPTION OF THE DRAWING

Other objects and attendant advantages of the present invention will become apparent from the following more detailed explanation when taken with the single FIGURE drawing showing a diagrammatic arrangement of the empty/load brake apparatus and its connection with a combined control valve and dual piston brake actuator of the type mentioned in the foregoing.

DESCRIPTION AND OPERATION

The brake apparatus of the present invention includes a combined brake cylinder and air reservoir device 1 having a main body 2 with different size cylindrical portions 3 and 4. The smaller cylindrical portion 3 is bolted to a central wall 5 of body 2, while the larger cylindrical portion 4 is integral with the main body and is closed by a separate closure member 6.

Cylindrical portion 3 contains a positioning piston 7 that cooperates with the end wall of cylindrical portion 3 to form a positioning chamber 8 at one end. Cylindrical portion 4 contains a power piston 9 that cooperates with central member 5 to form a brake application chamber 10 at one end and with closure member 6 to form a brake release chamber 11 at its opposite end. Positioning piston 7 and power piston 9 are connected together as an integral dual piston assembly having two separate piston areas.

Power piston 9 is in turn connected to a hollow piston rod 12 that sealingly extends through an opening 13 in closure member 6. Standard type brake rigging (not shown) may be actuated by a push rod 14 carried within and extending from hollow piston rod 12 in a conventional manner to transmit brake forces generated at pistons 7 and 9. A return spring 15 is disposed in chamber 11 and acts on piston 9 to urge piston 9 from a brake application position, as shown, to a brake release position, in which a cushion stop carried by the piston engages central wall 5.

An enclosure member 16 is suitably mounted at a flange thereof to main body 2, so as to form an emergency pressure chamber 17 between the enclosure member 16 and the smaller cylindrical portion 3 of main body 2. A mounting boss 18 of brake cylinder device 1 is integral with main body 2 and includes a quick action chamber 19, a plurality of passages 194, 202, 171 and 174 connected to the various chambers of the brake cylinder device, and a branch passage 171a of passage 171. Also connected to mounting boss 18 is a branch pipe 20 of the train brake pipe, an exhaust pipe 21 connected to passage 211, and a pipe 22 connected to branch passage 171a. Pipes 21 and 22 are connected at their other end to an empty/load valve device 23 of the present invention.

Valve device 23 comprises an exhaust check valve 24 and a load piston 25 engageable with check valve 24. The brake cylinder application chamber 10 is communicated with the face of load piston 25 via pipe 22. A spring 26 acts on check valve 24 on the side opposite from load piston 25. A passage 27 and branch passage 28 establish fluid pressure communication between release chamber 11 and the underside of check valve 24. An annular valve seat 29 is associated with check valve 24 so as to establish or interrupt fluid pressure communication between the underside of check valve 24 and an exhaust passage 30.

A changeover valve device 31 is mounted on the sprung portion of the vehicle and is connected to passage 27 via a flexible line 32. A choke 33 is located in passage 27 downstream of the branch connection of passage 28. Changeover valve device 31 is a two-position, three-connection, pneumatic valve having an actuator arm 34 that is adapted to engage a sensing member 35 formed on the unsprung portion of the railway vehicle. Relative displacement between the sprung and unsprung portions of the railway vehicle under different load conditions is effective to set the changeover valve in one or the other of its two positions. In one position, as indicated by a solid line in the diagrammatic representation of the changeover valve connections corresponding to relatively large deflections of the sprung portion under "load" conditions of vehicle loading, line 32 is vented to atmosphere, while in the other position represented by a dashed line corresponding to relatively small deflections of the sprung portion under "empty" load conditions of the vehicle, line 32 is cut off from atmosphere.

Valve device 23 further comprises an exhaust shut-off valve device 36 comprising a diaphragm valve 37 and a spring 38. A branch line 39 of line 32 is connected to a chamber 40 formed on the underside of diaphragm valve 37, while a branch passage 41 of passage 27 is connected from a point upstream of choke 33 to a chamber 42 formed on the upper side of diaphragm valve 37. In the shown upper position of diaphragm valve 37, an annular valve seat 43 formed on the diaphragm valve 37 engages the casing surrounding the outlet port of passage 41, thereby cutting off communication between passage 41 and a passage 44 leading from chamber 42 to atmosphere. In the lower position of diaphragm 37, seat 43 is disengaged from the casing, thereby placing passages 41 and 44 in communication.

Attached to the face of mounting boss 18 is a brake control valve device 45, which is fully described in the aforementioned referencing patent application beginning on page 9, line 20.

Basically, control valve device 45 on the respective cars of a train responds to increasing air pressure in branch pipe 20 of the train brake pipe to charge chambers 10 and 11 to the pressure carried in the train brake pipe. In that the air pressure in these chambers exerts counteracting forces on opposite sides of power piston 9, return spring 15 is effective to force the power piston into its leftward-most position, in which the car brakes are released. Concurrently, the air supplied to chamber 10 is connected by branch passage 171a and pipe 22 to the face of load piston 25, thereby biasing check valve 24 in accordance with the brake pipe charge carried by the train. During this charging and brake release period, chamber 11 is cut off from exhaust pipe 21 by the service valve of control valve device 45. It will become apparent that the bias level of check valve 24 sets the pressure level to which the compressed air in chamber 11 of brake cylinder device 1 is able to reduce during a subsequent "empty" car brake application, as hereinafter explained.

Under "load" conditions of car loading, the sprung portion of the car is deflected downwardly relative to the unsprung portion sufficiently to cause the upper flange of sensing arm 34 to engage the unsprung member 35 and thereby set changeover valve 31 to its shown position (solid line) in which line 32 is vented to atmosphere.

When a service brake application is made, control valve device 45 responds to the service rate of brake pipe reduction to terminate system charging and to initiate local quick service reduction of brake pipe pressure by connecting brake pipe air to positioning chamber 8, as fully explained on pages 18 and 19 of the referencing application. Concurrently, the compressed air stored in release chamber 11 is also connected to positioning chamber 8 where it combines with the quick service brake pipe air to effect movement of tandem pistons 7 and 9 in a brake application direction. During this movement of pistons 7 and 9 to brake application position, wherein the volume of release chamber 11 is reduced and the volume of application chamber 10 is increased, a one-way check valve accommodates equalization of air between these chambers, such that the pressure of air in chamber 11 and thus the force exerted by load piston 25 remains relatively constant at a value corresponding to the pressure charge of the train brake pipe.

In application position of pistons 7 and 9, the air in the reduced volume release chamber 11 is connected to atmosphere via passage 211 in control valve device 45, pipe 21, passage 27 and choke 33 in empty/load valve device 23, line 32 and changeover valve device 31. Due to choke 33, back pressure from this exhausting release chamber air is created, which is registered under check valve 24 and above diaphragm valve 37 via branch passages 28 and 41, respectively. The force exerted by this pressure acting under check valve 24 is insufficient to unseat the check valve against the bias force exerted by load piston 25. However, the pressure acting on diaphragm valve 37 within the area bounded by valve seat 43 exerts sufficient force to overcome the opposing force of light spring 38. The resultant deflection of diaphragm valve 37 results in disengagement of valve seat 43, thereby connecting the release chamber air directly to atmosphere via passage 44 in bypass of choke 33. Consequently, there is no empty/load control of the release chamber air being exhausted to atmosphere, so that the degree of brake application realized corresponds to the usual brake pressures obtained in both service and emergency, as explained on pages 35 and 36 of the referencing U.S. patent application. In service, a service limiting check valve retains a predetermined pressure in release chamber 11, while in emergency, complete venting of release chamber 11 occurs in by-pass of the service limiting check valve, thereby contributing to achieving a higher emergency than service brake force.

Under "empty" conditions of car loading, the deflection of the sprung portion of the car relative to the unsprung portion is such that the lower flange of sensing arm 34 engages the unsprung member 35 to set changeover valve device 31 in a position (dashed line) in which line 32 is cut off from atmosphere.

When a service brake application is made, as previously explained, air in release chamber 11 is connected to exhaust pipe 21. Since this air is cut off from atmosphere at changeover valve 31, back pressure develops in chamber 40 below diaphragm valve 37 of exhaust shut-off valve device 36. This pressure acting under the full area of diaphragm valve 37 cooperates with spring 38 to exert an upward-acting force sufficient to maintain diaphragm valve 37 seated to cut off the exhaust communication between passages 41 and 44 Consequently, back pressure is capable of developing under check valve 24 to exert a force sufficient to overcome the opposing bias of load piston 25 and accordingly unseat the check valve Preferably, the area under check valve 24 subject to this back pressure from release chamber 11 is greater than the opposing area of load piston 25 subject to the pressure effective in application chamber 10. The force derived from the upward-acting differential pressure area, when combined with the force of spring 26, allows check valve 24 to remain open in order to exhaust release chamber air via passage 30 until the pressure of the air in release chamber 11 is reduced to a certain chosen value. At this point, the forces across the check valve 24 act to seat the check valve 24 and terminate any further reduction of release chamber air. In so limiting the reduction of the release chamber air pressure, it will be apparent that a reduced brake effort is realized in accordance with the "empty" load setting of changeover valve device 31. Since the load piston 25, which sets the bias on check valve 24, is subject to different pressures corresponding to the brake pipe charge carried by the train, the maximum reduction of release chamber air pressure is limited to a higher value as the brake pipe charge carried by the train increases. Accordingly, the maximum "empty" car brake force capable of being obtained is greater on trains carrying a higher brake pipe charge. Such an arrangement continues to provide protection against slid flat wheels and to give better distribution of retardation forces on cars having different loads dispersed throughout a train, while giving the flexibility of permitting higher "empty" car brake forces on cars in trains carrying relatively higher brake pipe charges.

In the event car jounce and rocking occurs with sufficient intensity to cyclically operate the changeover valve device between its "empty" and "load" settings, choke 33 will control the resultant pressure change in chambers 40 and 42 in order to stabilize the exhaust shut-off valve device 36 against inadvertent operation from its proper position.

When changeover valve 31 is set in its lower position, in accordance with the "empty" condition of car load, chamber 40 of exhaust shut-off valve device 36 is cut off from atmosphere, as hereinbefore explained, whereby diaphragm valve 37 is forced to its uppermost position by the force of spring 38 and the pressure of air acting in chamber 40 in opposition to the pressure effective in chamber 42. If changeover valve device 31 is subsequently shifted momentarily into its "load" setting due to car jounce and/or rock, air in chamber 40 will be vented to atmosphere via branch line 39, line 32 and changeover valve device 31. Assuming, however, that the release chamber air has been cut off from atmosphere by empty/load check valve 24, this air flows to atmosphere at the changeover valve device 31 via choke 33 and line 32, thereby tending to retard the exhaust of air from chamber 40. In this manner, the pressure in chamber 40 is prevented from falling to a value sufficient to allow diaphragm valve 37 to shift to its downward-most position within a predetermined period of time. This predetermined period of time is selected in accordance with the normal oscillatory period or frequency of a jouncing or rocking railway car, so that the changeover valve will normally reset to its proper load condition setting before the pressure in chamber 40 is reduced to a level sufficient to shift the diaphragm valve 37.

When changeover valve 31 is set in its upper position in accordance with the "load" condition of a car, diaphragm valve 37 is deflected to its downward-most position to directly exhaust the release chamber air via passages 27, 41 and 44 in the empty/load valve device 23. In this instance, the effect of choke 33 during inadvertent transition of the changeover valve to "empty" position due to car jounce and rock is to restrict the buildup of air pressure in chamber 40 to a value sufficient to shift diaphragm valve 37 to its uppermost position until a predetermined duration has expired. This predetermined delay period is selected in accordance with the normal oscillatory period or frequency of a jouncing or rocking car, thereby allowing the changeover valve sufficient time to reset to its proper load condition setting before transition of exhaust shut-off valve device 36 can occur.

In so delaying transition of exhaust shut-off valve 36 by proper sizing of choke 33, chambers 40 and 42, the effective areas of diaphragm valve 37, and the spring 38, the empty/load valve device 23 is stabilized in the proper "empty" or "load" condition setting, so as to desensitize the system to car jounce and rock during a brake application, thus preserving the desirable characteristics of wheel slide protection and equalized retardation of the different loaded cars in a train.

Having now described the invention, what I claim as new and desire to secure by Letters Patent, is:

1. Fluid pressure brake apparatus for a railway vehicle operative in response to variation of fluid pressure in a brake pipe of said vehicle normally charged to a certain chosen value comprising:
   (a) a brake cylinder device including at least one piston forming an application chamber and a release chamber on opposite sides thereof in which fluid pressure is normally stored at a value corresponding to said certain chosen value;
   (b) control valve means including an exhaust passage operative in response to a reduction of said brake pipe fluid pressure for connecting fluid under pressure from said release chamber to atmosphere via said exhaust passage, said at least one piston being operative in response to said exhaust of fluid under pressure from said release chamber to provide a brake application force in accordance with the pressure differential between said application and release chambers;
   (c) changeover valve means for sensing an "empty" condition of vehicle loading so as to interrupt said connection of fluid under pressure from said release chamber to atmosphere; and
   (d) check valve means for connecting said exhaust passage to atmosphere in bypass of said changeover valve means so long as the pressure in said exhaust passage exceeds a predetermined value, said predetermined value being different for different values of said normally chosen brake pipe fluid pressure.

2. Fluid pressure brake apparatus, as recited in claim 1, wherein said check valve mean comprises:
   (a) a valve seat;
   (b) a disc valve subject on one side thereof to said release chamber fluid under pressure in said exhaust passage to urge said disc valve in a direction to effect disengagement thereof from said valve seat; and
   (c) a piston engageable with the side of said disc valve opposite said one side, the face of said piston being subject to said application chamber fluid under pressure to urge said disc valve toward engagement with said seat.

3. Fluid pressure brake apparatus, as recited in claim 2, wherein said one side of said disc valve and said face of said piston provide a differential effective pressure area.

4. Fluid pressure brake apparatus, as recited in claim 2, wherein the effective pressure area of said one side of said disc valve is greater than the effective pressure area of said face of said piston.

5. Fluid pressure brake apparatus, as recited in claim 2, further comprising a spring acting on said one side of said disc valve to urge said disc valve in a direction to effect disengagement thereof.

6. Fluid pressure brake apparatus, as recited in claim 5, wherein wherein said one side of said disc valve has a greater effective pressure area than said face of said piston.

7. Fluid pressure brake apparatus, as recited in claim 1, wherein said changeover valve means comprises:
   (a) a two position pneumatic valve having an inlet connected to said exhaust passage and an outlet connected to atmosphere, said pneumatic valve being mountable on one of the sprung or unsprung portions of said vehicle; and
   (b) a sensing arm engageable with the other of said sprung or unsprung portions to set said pneumatic valve in a load position when the relative distance between said sprung and unsprung portions is a certain predetermined amount, whereby said inlet is connected to said outlet, and to set said pneumatic valve in an empty position when the relative distance between said sprung and unsprung portions exceeds said predetermined amount, whereby said inlet is cut off from said outlet.

8. Fluid pressure brake apparatus, as recited in claim 7, further comprising means for restricting the venting of said release chamber fluid pressure via said exhaust passage.

9. Fluid pressure brake apparatus, as recited in claim 8, wherein said restricting means comprises a choke in said exhaust passage between said atmospheric connections of said exhaust passage at said check valve means and said changeover valve means.

10. Fluid pressure brake apparatus, as recited in claim 8, further comprising exhaust shut-off valve means for controlling said venting of said release chamber fluid pressure in parallel with said check valve means and said changeover valve means.

11. Fluid pressure brake apparatus, as recited in claim 9, wherein said exhaust shut-off valve means comprises:
   (a) a diaphragm;
   (b) first and second chambers formed in a casing on opposite sides of said diaphragm;
   (c) a first passage connected between said exhaust passage at a point upstream of said restriction means and said first chamber;
   (d) a second passage connected between said exhaust passage at a point downstream of said restriction means and said second chamber;
   (e) a third passage connected between said first chamber and atmosphere;
   (f) an annular lip formed on said diaphragm; and
   (g) a spring acting on said diaphragm in a direction to seat said annular lip on the casing of said first chamber in surrounding relationship with the opening of said first passage thereinto, fluid pressure communication between said first and third passages being established when said diaphragm lip is unseated from the casing of said first opening and interrupted when said diaphragm lip is seated on said casing.

* * * * *